United States Patent
Shigeta

(10) Patent No.: US 7,120,829 B2
(45) Date of Patent: Oct. 10, 2006

(54) FAILURE PROPAGATION PATH ESTIMATE SYSTEM

(75) Inventor: Kazuki Shigeta, Tokyo (JP)

(73) Assignee: NEC Electronics Corporation, Kanagawa (JP)

( * ) Notice: Subject to any disclaimer, the term of this patent is extended or adjusted under 35 U.S.C. 154(b) by 631 days.

(21) Appl. No.: 10/194,773

(22) Filed: Jul. 12, 2002

(65) Prior Publication Data
US 2003/0066000 A1 Apr. 3, 2003

(30) Foreign Application Priority Data
Jul. 12, 2001 (JP) .............................. 2001-212502

(51) Int. Cl.
G06F 11/00 (2006.01)

(52) U.S. Cl. ............................ 714/25; 714/32; 714/33; 714/37; 714/39; 714/45

(58) Field of Classification Search .................. 714/25, 714/27, 32, 33, 37, 39, 45
See application file for complete search history.

(56) References Cited

U.S. PATENT DOCUMENTS

| | | | | |
|---|---|---|---|---|
| 5,944,847 A | * | 8/1999 | Sanada | 714/741 |
| 5,968,195 A | * | 10/1999 | Ishiyama | 714/727 |
| 5,996,101 A | * | 11/1999 | Masumoto | 714/25 |
| 6,397,362 B1 | * | 5/2002 | Ishiyama | 714/724 |

FOREIGN PATENT DOCUMENTS

| | | |
|---|---|---|
| JP | 8-94714 | 4/1996 |
| JP | 8-146093 | 6/1996 |
| JP | 10-62494 | 3/1998 |
| JP | 11-52023 | 2/1999 |
| JP | 11-153646 | 6/1999 |
| JP | 11-160400 | 6/1999 |
| JP | 2001-21618 | 1/2001 |

* cited by examiner

Primary Examiner—Bryce P. Bonzo
Assistant Examiner—Joseph D Manoskey
(74) Attorney, Agent, or Firm—Scully, Scott, Murphy & Presser, P.C

(57) ABSTRACT

The present invention provides a technique relating to a failure propagation path estimate system which can realize an estimate process by adding the measurement result to the failure location estimate results estimated prior to the measurement, and which can realize high-speed re-calculation of only part of a large-scale circuit relating to the measurement point.

As shown in FIG. 1, the failure propagation path estimate system according to the present embodiment is generally provided with an input device 1 such as a keyboard or an interface for external devices, a failure propagation path estimate processor (failure propagation path estimate device, error propagation path estimate processor) 2 operated under the control of a program, a storage device 4 for storing information necessary for the failure propagation path estimate process, and an output device 5 such as a display device, a printer or an interface for external devices.

14 Claims, 11 Drawing Sheets

FAILURE PROPAGATION PATH ESTIMATE SYSTEM

FIELD OF THE INVENTION

The present invention relates to a failure propagation path estimate system for a logic circuit. More particularly, the present invention belongs to a technique relating to a failure propagation path estimate system for estimating a failure propagation path from a failure output terminal in the input direction.

BACKGROUND OF THE INVENTION

Conventionally, a failure location estimate system estimates a path which may be propagating a failure that conforms an output pattern that includes a failure output, and estimating the failure location based on that information.

According to the techniques described in Japanese Laid-Open Patent Application Nos. 08-146093 and 10-062494, a sub-circuit relating to a failure output terminal is extracted to estimate a failure propagation path in the sub-circuit. If necessary, a sub-circuit on the input side is further extracted. Thus, all failure propagation paths are estimated. Then, the weights of the nodes on the paths are calculated based on the connection information of the estimated paths to determine and output nodes with heavier weights in the logic circuit as failure candidates.

Hereinafter, a structure of a conventional technique will be described with reference to the drawings.

FIG. 10 is a block diagram showing an exemplary configuration of a failure propagation path estimate system according to a conventional technique.

Referring to FIG. 10, the system includes an input device 101 which is an interface for a keyboard or other external devices, a failure propagation path estimate processor (or a failure propagation path estimate device or an error propagation path estimate processor) 102 which is operated under the control of a program, a storage device 104 for storing information necessary for a failure propagation path estimate process, and an output device 105 which is an interface for a display device, a printer or other external devices.

The storage device 104 is provided with a logic circuit configuration memory unit 141 and a logic state memory unit 142. The logic circuit configuration memory unit 141 already stores connection relationship among gates and signal lines configuring the logic circuit as well as functions of the gates.

The logic state memory unit 142 stores logic states of individual signal lines subjected to the failure propagation path estimate process as well as logic states (expected values) of the individual signal lines when the circuit is in a normal state.

The failure propagation path estimate device 102 is provided with a failure terminal searching unit 121, a sub-circuit extracting unit 122, a sub-circuit logic state estimating unit 123, a logic state registering unit 124, a failure candidate searching unit 125 and a failure candidate outputting unit 126.

The failure terminal searching unit 121 searches for a failure output terminal by referring to the circuit configuration stored in the logic circuit configuration memory unit 141 and the logic states stored in the logic state memory unit 142. When there is no search target, the failure propagation path estimate process is terminated.

The sub-circuit extracting unit 122 extracts a sub-circuit relating to the failure output terminal searched by the failure terminal searching unit 121 by referring to the circuit configuration stored in the logic circuit configuration memory unit 141.

The sub-circuit logic state estimating unit 123 estimates failure propagation paths within the sub-circuit by referring to the circuit configuration stored in the logic circuit configuration memory unit 141 and the logic states of the boundary of the sub-circuit stored in the logic state memory unit 142.

The logic state registering unit 124 registers the logic states of the sub-circuit estimated by the sub-circuit logic state estimating unit 123 in the logic state memory unit 142.

The failure candidate searching unit 125 searches for, as failure candidates, all nodes (gates, signal lines) on the failure propagation paths which may be propagating a failure state to the failure output, by referring to the failure propagation paths in the sub-circuit estimated by the sub-circuit logic state estimating unit 123.

The failure candidate outputting unit 126 outputs the failure candidates searched by the failure candidate searching unit 125 to the output device 5.

FIG. 11 is an exemplary flowchart of the operation of the system shown in FIG. 10.

The operation according to the conventional technique will be described with reference to FIGS. 10 and 11.

First, the failure terminal searching unit 121 searches for a failure output terminal by referring to the circuit configuration stored in the logic circuit configuration memory unit 141 and the logic states stored in the logic state memory unit 142 (Step A101).

When any search target, i.e., any failure output terminal, is detected, the operation proceeds to Step A103. When no search target is found, the failure propagation path estimate process is terminated (Step A102).

Then, the sub-circuit extracting unit 122 extracts a sub-circuit relating to the failure output terminal searched by the failure terminal searching unit 121 by referring to the circuit configuration stored in the logic circuit configuration memory unit 141 (Step A103). Extraction of the sub-circuit may be carried out by tracing the circuit for a few times in input/output directions or by utilizing the hierarchical design of the circuit as described in Japanese Laid-Open Patent Application No. 10-062494.

Next, the sub-circuit logic state estimating unit 123 estimates failure propagation paths in the sub-circuit by referring to the circuit configuration stored in the logic circuit configuration memory unit 141 as well as the logic states of the boundary of the sub-circuit stored in the logic state memory unit 142 (Step A104).

Then, the logic state registering unit 124 registers the logic states of the sub-circuit estimated in Step A104 in the logic state memory unit 142 (Step A105).

In Step A106, the failure candidate searching unit 125 searches for, as failure candidates, all nodes (gates, signal lines) on the failure propagation paths which may propagate a failure state to the failure output, by referring to the failure propagation paths in the sub-circuit estimated by the sub-circuit logic state estimating unit 123.

The failure candidate outputting unit 126 outputs the failure candidates searched by the failure candidate searching unit 125 to the output device 105 (Step A107).

FIG. 6 is a diagram showing examples of implication operations for 2-input NAND gates in input/output directions.

FIG. 7 is a diagram showing examples of expected values of input/output terminals and logic values of the output signals.

FIG. 8 is a diagram showing an exemplary decision tree for determining logic states.

FIG. 9 is a diagram showing exemplary results of the decision tree.

The flow of operation according to the conventional technique will be described in more detail with reference to FIGS. 6 to 11.

Assume that expected values of the input/output terminals as well as logic values of the output signals (L22=1, L23=1) of target gates are given at an initial state. Then, as can be appreciated from the figure, L23 is the failure output.

The initial state and the expected values of the input/output terminals and the signal lines are as follows: L1=X[1], L2=X[1], L3=X[1], L6=X[1], L7=X[1], L22=1[1] and L23 =1 [0] (numbers in brackets represent the expected values).

In Step A101, the failure terminal searching unit 121 searches the logic circuit for a failure output terminal, whereby L23 is found as the failure terminal.

Since an unprocessed failure terminal is detected, the operation proceeds to Step A103 (Step A102).

In Step A103, a sub-circuit relating to L23 is extracted by the sub-circuit extracting unit 122. Herein, the whole circuit is extracted.

Next, in Step A104, logic states in the sub-circuit are estimated by the sub-circuit logic state estimating unit 123.

Since there is no signal line state implicated by L22=1 and L23=1, signal lines whose logic values are to be assumed are searched. According to Japanese Laid-Open Patent Application No. 11-153646, logic values are assumed for input signal lines of gates which are connected to the failure signal line and whose states have not been confirmed (unconfirmed gate).

Referring to FIG. 6 which shows implication operations for the 2-input NAND gates in input/output directions, when the logic value of an output signal line is [1], either one of the logic values [X] of input signal lines should be [0]. When both of the logic values of the input signal lines are not yet confirmed, the gate is judged as an unconfirmed gate. Here, L16, one of the input signal lines of the gate G23 connected to the failure signal line L23 is assumed to have a logic value [0]. If L16=0, then L2=1 and L11=1 are implicated according to the implication operation for G16.

Thereafter, the implication operation and logic assumption are repeated by assuming logic values for two signal lines, thereby determining three sets of logic states as represented by the decision tree shown in FIG. 8. The determined logic states in the circuit are expressed by logic values of individual signal lines in the order of (L1, L2, L3, L6, L7, L10, L11, L16, L19, L22, L23) within the blocks in FIG. 8. The underlines represent failure propagation paths which differ from the expected values.

Then, in Step A105, the determined logic states in the logic circuit as well as the failure propagation paths are registered in the logic state memory unit 142.

Again, any failure terminal is searched for by the failure terminal searching unit 121 (Step A101). Since there is no unprocessed failure terminal, the operation proceeds to Step A106 (Step A102).

In Step A106, failure candidates on the failure propagation paths are searched for. At this point, three sets of states have been determined. As the failure candidates, {L3, L11, L16, L23} are obtained from a set of states for case1= (X10XX110X11), {L6, L11, L16, L23} are obtained from a set of states for case2=(X110XX10X11), and {L6, L11, L16, L23} are obtained from a set of states for case3= (10101011011). Although L10 is estimated to differ from the expected value, it is neglected since a failure occurring at L10 would not affect L23. L2 in case3 is also neglected for not affecting L23.

These failure candidates are output in Step A107.

Next, a case is assumed where [0] is obtained as a logic state of L11 by measurement of the LSI. According to the conventional technique, the states in the circuit have to be estimated from the failure output terminal again.

L16, one of the input signal lines of the gate G23 connected to the failure signal line L23 is assumed to have a logic value of [0]. If L16=0, then L2=1 and L11=1 are implicated according to the implication operation for G16. However, since an actual measurement value of L11 is obtained as 0, path tracing for L16 ends here.

Next, if L16=1 is assumed, then L10=0 for G22, L19=0 for G23, and L7=1 and L11=1 for G19 are implicated. Since an actual measurement value of L11 is obtained as 0, the estimate process ends due to logic contradiction. Accordingly, a decision tree shown in FIG. 9 is obtained.

Consequently, two sets of logic states are determined. As failure candidates, {L16, L23} are determined from a set of states (XXXXXX00X11) and {L19, L23} are determined from a set of states (XXXXX001011). These failure candidates are output in Step A107.

Next, a case is assumed where [1] is obtained as a logic state of L11 by measurement of the LSI. According to the conventional technique, the states in the circuit have to be estimated from the failure output terminal again.

L16, one of the input signal lines of the gate G23 connected to the failure signal line L23 is assumed to have a logic value of [0]. If L16=0, then L2=1 and L11=1 are implicated according to the implication operation for G16. Since an actual measurement value of L11 is obtained as 1, no contradiction occurs.

By repeating the logic assumption and the implication operation to carry on the estimate process, a decision tree identical to that shown in FIG. 8 is obtained where three sets of logic states are determined. As failure candidates, {L3, L11, L16, L23} are determined from a set of states (X10XX110X11), {L6, L11, L16, L23} are determined from a set of states (X110XX10X11), and {L6, L11, L19, L23} are determined from a set of states (10101011011).

These failure candidates are output in Step A107.

According to the conventional technique, the failure location estimate process has to be repeated from the beginning, meaning that information of a measurement point cannot be fed back to the results of the failure location estimate process. Therefore, the process needs to undergo the same calculation without utilizing the results from the previous estimate process. As a result, the circuit becomes large-scale, and calculation will be enormous when the measurement point is distant from the failure output terminal and deep inside the circuit.

The conventional technique has the following problems.

A first problem is that the failure location estimate process needs to be carried out from the beginning whenever a measurement result is obtained. This is because there is no means for performing the estimate process while adding information of the measurement results to the already estimated results.

A second problem is that the process of re-calculation based on the measurement results takes long time in a large-scale circuit. This is because there is no means for re-calculating only the part relating to the measurement point.

As described above for the operation according to the conventional technique, when information of measurement points is fed back to the results of the failure location estimate process, the failure location estimate process has to be repeated from the beginning. Therefore, the process needs to undergo the same calculation without utilizing the results from the previous estimate process. As a result, the circuit becomes large, and calculation will be enormous when the measurement point is distant from the failure output terminal and deep inside the circuit.

SUMMARY OF THE INVENTION

In view of the above-described problems, the present invention has an objective of providing a technique relating to a failure propagation path estimate system in which measurement results are added to results from a previously estimated failure location estimate process to perform an estimate process and in which only part of the-large-scale circuit relating to the measurement points re-calculated rapidly.

In present invention, a failure propagation path estimate system for estimating a logic state and a failure propagation path in a logic circuit by repeating an assumption and an implication operation of logic values based on a failure output terminal in the logic circuit, the system comprising: a re-calculation judging unit for judging whether a present process is an initial estimate process or re-calculation following a measurement, where the re-calculation is performed, when an initial failure location estimate process has already taken place, to reflect the measurement result on the result obtained from the failure location estimate process; a failure propagation path searching unit for searching the failure propagation paths obtained from the previous estimate process; a measurement point neighborhood implication operation unit for verifying logic values of paths relating to a measurement point for each of the searched failure propagation paths, including a path whose logic state is implicated upon confirming the logic value of the measurement point and a path causative of propagating a failure state to the measurement point; and a failure propagation path updating unit for updating the failure propagation path according to the verified results.

Moreover, a failure propagation path estimate system according to present invention, wherein the measurement point neighborhood implication operation unit verifies a plurality of failure propagation paths at once by overlapping the plurality of failure propagation paths, to verify logic values of paths relating to the measurement point, including a path whose logic state is implicated upon confirming the logic value of the measurement point and a path causative of propagating a failure state to the measurement point.

Moreover, a failure propagation path estimate system according to present invention, wherein the measurement point neighborhood implication operation unit comprises: an input-direction critical path searching unit which, when an actual measurement value of the measurement point is a normal value identical to the expected value, traces the failure propagation paths in the input direction using the measurement point as a basic point, and changes logic values of the paths propagating the failure state to the measurement point to values that does not contradict with the actual measurement value of the measurement point; and a contradicting path deleting unit for deleting the failure propagation path information that contradicts with the actual measurement value of the measurement point.

Moreover, a failure propagation path estimate system according to present invention, wherein the measurement point neighborhood implication operation unit comprises an output-direction critical path searching unit which, when an actual measurement value of the measurement point is an unexpected value that differs from the expected value, traces the failure propagation paths in the output direction using the measurement point as a basic point, and searches for any path which is implicated to have a failure state due to the measurement point.

Moreover, a failure propagation path estimate method for estimating a logic state and a failure propagation path in a logic circuit by repeating an assumption and an implication operation based on a failure output terminal in the logic circuit, the method comprising: a first step of judging whether a present process is an initial estimate process or re-calculation following a measurement, where the re-calculation is performed, when an initial failure location estimate process has already taken place, to reflect the measurement result on the result from the failure location estimate process; a second step of searching the failure propagation paths obtained from the previous estimate process; a third step of verifying logic values of paths relating to a measurement point for each of the searched failure propagation paths, including a path whose logic state is implicated upon confirming the logic value of the measurement point and a path causative of propagating a failure state to the measurement point; and a fourth step of updating the failure propagation path according to the verified results obtained by the third step.

Moreover, a failure propagation path estimate method according to present invention, wherein the third step comprises a step of verifying a plurality of failure propagation paths at once by overlapping the plurality of failure propagation paths, to verify logic values of paths relating to the measurement point, including a path whose logic state is implicated upon confirming the logic value of the measurement point and a path causative of propagating of a failure state to the measurement point.

Moreover, a failure propagation path estimate method according to present invention, wherein the third step, when an actual measurement value of the measurement point is a normal value identical to the expected value, comprises steps of: tracing the failure propagation paths in the input direction using the measurement point as a basic point, and changing logic values of the paths propagating the failure state to the measurement point to values that does not contradict with the actual measurement value of the measurement point; and deleting the failure propagation path information that contradicts with the actual measurement value of the measurement point.

Moreover, a failure propagation path estimate method according to present invention, wherein the third step, when an actual measurement value of the measurement point is an unexpected value that differs from the expected value, comprises the steps of: tracing the failure propagation paths in the output direction using the measurement point as a basic point; and searching for any path which is implicated to have a failure state due to the measurement point.

Moreover, in present invention, a storage medium for storing a computer program product to execute a failure propagation path estimate process for estimating a logic state and a failure propagation path in a logic circuit by repeating an assumption and an implication operation of logic values based on a failure output terminal in the logic circuit, the process comprising: a re-calculation judging step for judging whether a present process is an initial estimate process or re-calculation following a measurement, where the re-calculation is performed, when an initial failure location estimate process has already taken place, to reflect the measurement result on the result obtained from the failure location estimate process; a failure propagation path searching step for searching the failure propagation paths obtained from the previous estimate process; a measurement point neighborhood implication operation step for verifying logic values of paths relating to a measurement point for each of the searched failure propagation paths, including a path whose logic state is implicated upon confirming the logic value of the measurement point and a path causative of propagating a failure state to the measurement point; and a failure propagation path updating step for updating the failure propagation path according to the verified results.

Moreover, a storage medium for storing a computer program product to execute a failure propagation path estimate process for estimating a logic state and a failure propagation path in a logic circuit by repeating an assumption and an implication operation of logic values based on a failure output terminal in the logic circuit, where re-calculation is performed, when an initial failure location estimate process has already taken place, to reflect the measurement result on the result obtained from the failure location estimate process, wherein the process comprises: a measurement point neighborhood implication operation step for verifying a plurality of failure propagation paths at once by overlapping the plurality of failure propagation paths, to verify logic values of paths relating to the measurement point, including a path whose logic state is implicated upon confirming the logic value of the measurement point and a path causative of propagating a failure state to the measurement point.

Moreover, a storage medium for storing a computer program product to execute a failure propagation path estimate process for estimating a logic state and a failure propagation path in a logic circuit by repeating an assumption and an implication operation of logic values based on a failure output terminal in the logic circuit, where re-calculation is performed, when an initial failure location estimate process has already taken place, to reflect the measurement result on the result obtained from the failure location estimate process, wherein, when an actual measurement value of the measurement point is a normal value identical to the expected value, the failure propagation path estimate process further comprises: an input-direction critical path searching step in which the failure propagation paths are traced in the input direction using the measurement point as a basic point, and logic values of the paths propagating the failure state to the measurement point are changed to values that does not contradict with the actual measurement value of the measurement point; and a contradicting path deleting step for deleting the failure propagation path information that contradicts with the actual measurement value of the measurement point.

Moreover, a storage medium for storing a computer program product to execute a failure propagation path estimate process for estimating a logic state and a failure propagation path in a logic circuit by repeating an assumption and an implication operation of logic values based on a failure output terminal in the logic circuit, where re-calculation is performed, when an initial failure location estimate process has already taken place, to reflect the measurement result on the result obtained from the failure location estimate process, wherein, when an actual measurement value of the measurement point is an unexpected value that differs from the expected value, the failure propagation path estimate process further comprises:

an output-direction critical path searching step in which the failure propagation paths are traced in the output direction using the measurement point as a basic point, and any path which is implicated to have a failure state due to the measurement point is searched.

Moreover, a storage medium for storing a computer program product capable of executing the failure propagation path estimate method, the method comprising: a first step of judging whether a present process is an initial estimate process or re-calculation following a measurement, where the re-calculation is performed, when an initial failure location estimate process has already taken place, to reflect the measurement result on the result from the failure location estimate process; a second step of searching the failure propagation paths obtained from the previous estimate process; a third step of verifying logic values of paths relating to a measurement point,for each of the searched failure propagation paths, including a path whose logic state is implicated upon confirming the logic value of the measurement point and a path causative of propagating a failure state to the measurement point; and a fourth step of updating the failure propagation path according to the verified results obtained by the third step.

DETAILED DESCRIPTION OF THE INVENTION

Hereinafter, preferred embodiment of the present invention will be described in detail with reference to the drawings.

Figure 1:
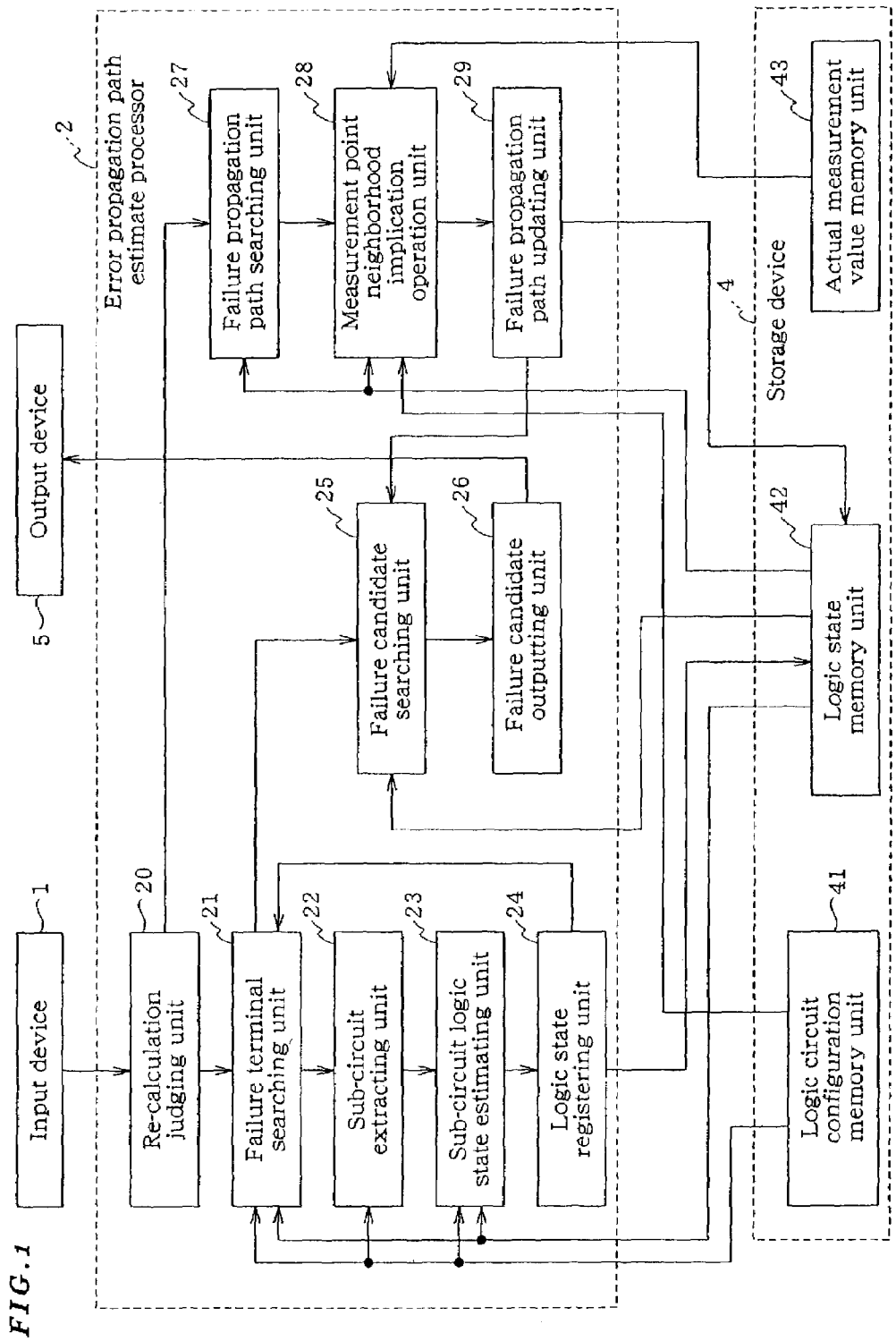
FIG. 1 is a block diagram schematically showing a configuration of a failure propagation path estimate system according to an embodiment of the invention.

FIG. 1 is a block diagram schematically showing a configuration of a failure propagation path estimate system according to the present embodiment.

As shown in FIG. 1, the failure propagation path estimate system according to the present embodiment is generally provided with an input device 1 which is an interface for a keyboard or other external devices, a failure propagation path estimate processor (or a failure propagation path estimate device or an error propagation path estimate processor) 2 which is operated under the control of a program, a storage device 4 for storing information necessary for a failure propagation path estimate process, and an output device 5 which is an interface for a display device, a printer or other external devices.

The storage device 4 is provided with a logic circuit configuration memory unit 41, a logic state memory unit 42 and an actual measurement value memory unit 43.

The logic circuit configuration memory unit 41 already stores connection relationship among gates and signal lines configuring the logic circuit as well as functions of the gates.

The logic state memory unit 42 stores logic states of individual signal lines subjected to the failure propagation path estimate process as well as logic states (expected values) of individual signal lines when the circuit is in a normal state.

The actual measurement value memory unit 43 stores logic states of nodes obtained with an analyzer.

The failure propagation path estimate processor (or the failure propagation path estimate device or the error propagation path estimate processor) 2 is provided with a re-calculation judging unit 20, a failure terminal searching unit 21, a sub-circuit extracting unit 22, a sub-circuit logic state estimating unit 23, a logic state registering unit 24, a failure candidate searching unit 25, a failure candidate outputting unit 26, a failure propagation path searching unit 27, a measurement point neighborhood implication operation unit 28 and a failure propagation path updating unit 29.

The re-calculation judging unit 20 judges whether the present process is an initial process or a re-process following measurement of an actual measurement value. In the former case, the operation proceeds to a step carried out by the failure terminal searching unit 21, and in the latter case, the operation proceeds to a step carried out by the failure propagation path searching unit 27.

The failure terminal searching unit 21 searches for a failure output terminal by referring to the circuit configuration stored in the logic circuit configuration memory unit 41 and the logic states stored in the logic state memory unit 42. When there is no search target, the failure propagation path estimate process is terminated.

The sub-circuit extracting unit 22 extracts a sub-circuit relating to the failure output terminal searched by the failure terminal searching unit 21 by referring to the circuit configuration stored in the logic circuit configuration memory unit 41.

The sub-circuit logic state estimating unit 23 estimates failure propagation paths within the sub-circuit by referring to the circuit configuration stored in the logic circuit configuration memory unit 41 and the logic states of the boundary of the sub-circuit stored in the logic state memory unit 42.

The logic state registering unit 24 registers the logic states of the sub-circuit estimated by the sub-circuit logic state estimating unit 23 in the logic state memory unit 42.

The failure candidate searching unit 25 searches for, as failure candidates, all nodes (gates, signal lines) on the failure propagation paths which may be propagating a failure state to the failure output, by referring to the failure propagation paths in the sub-circuit estimated by the sub-circuit logic state estimating unit 23.

The failure candidate outputting unit 26 outputs the failure candidates searched by the failure candidate searching unit 25 to the output device 5.

The failure propagation path searching unit 27 reproduces the logic states in the circuit by referring to the expected value of each node in the circuit stored in the logic state memory unit 42 and the estimated failure propagation paths.

The measurement point neighborhood implication operation unit 28 refers to the logic value of the measurement point stored in the actual measurement value memory unit 43. If the measurement point is a normal value, failure propagation paths that are propagating the failure state to the measurement point are searched for in the input direction. If the measurement point is an unexpected value, paths that are propagating the failure state from the measurement point are searched for in the output direction. Then, any path that contradicts with these paths is deleted.

Figure 2:
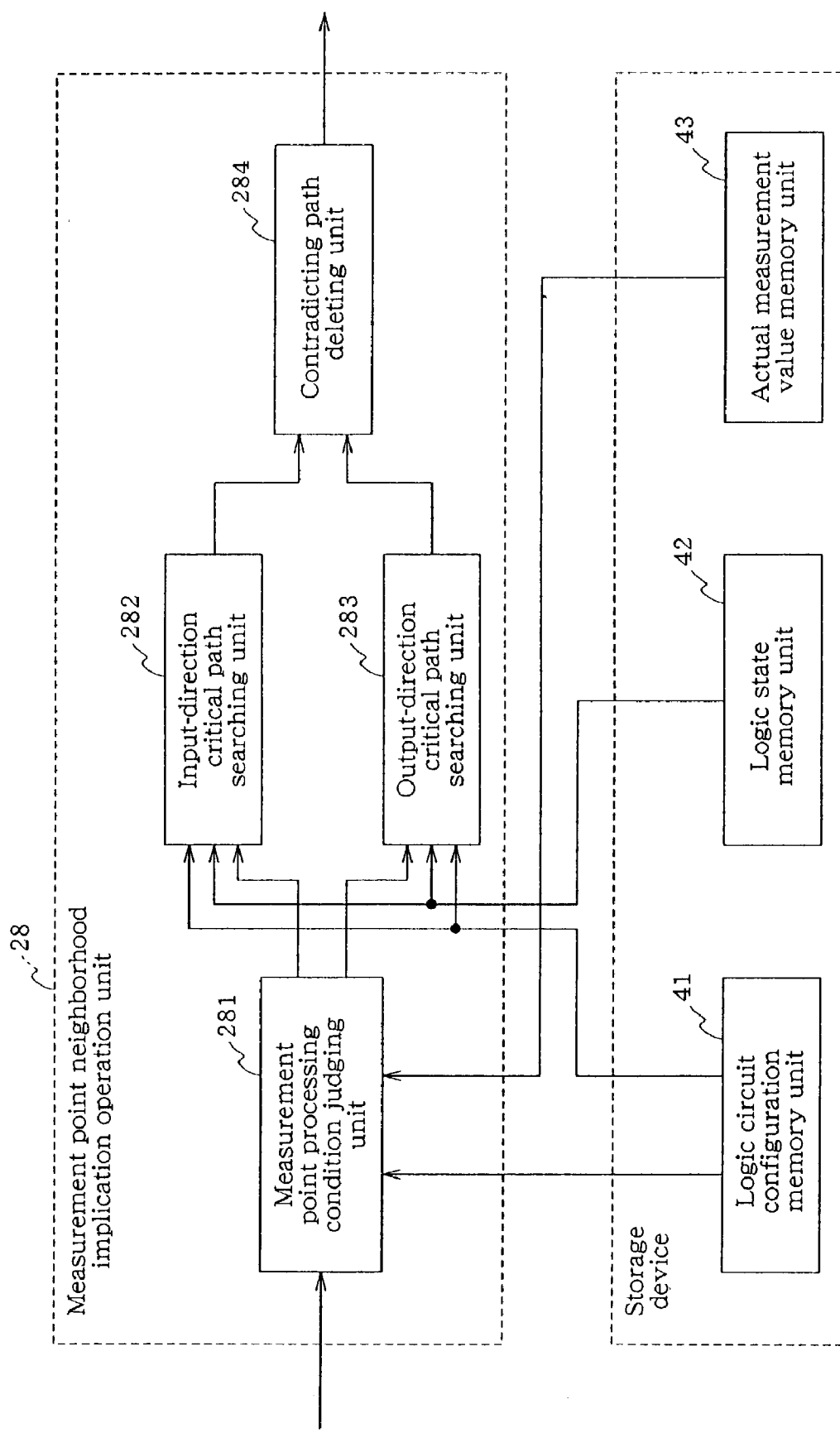
FIG. 2 is a block diagram showing a detailed configuration of a measurement point neighborhood implication operation unit shown in FIG. 1.

FIG. 2 is a block diagram showing a detailed configuration of the measurement point neighborhood implication operation unit 28 shown in FIG. 1.

As shown in FIG. 2, the measurement point neighborhood implication operation unit 28 is provided with a measurement point processing condition judging unit 281, an input-direction critical path searching unit 282, an output-direction critical path searching unit 283 and a contradicting path deleting unit 284.

The measurement point processing condition judging unit 281 refers to the expected value of the measurement point stored in the logic state memory unit 42 as well as the actual measurement value of the measurement point stored in the actual measurement value memory unit 43. If the logic value of the measurement point is a normal value identical to the expected value, the operation proceeds to a step carried out by the input-direction critical path searching unit 282. If the logic value of the measurement point is an unexpected value that differs from the expected value, the operation proceeds to a step carried out by the output-direction critical path searching unit 283.

The input-direction critical path searching unit 282, provided that the actual measurement value of the measurement point is a normal value, refers to the circuit configuration stored in the logic circuit configuration memory unit 41 as well as the failure propagation paths stored in the logic state memory unit 42 to trace the failure propagation paths in the input direction using the measurement point as the base point, and search for a critical path that propagates a failure state to the measurement point. The critical path is searched for by using the implication operation shown in FIG. 6 as the basic algorithm.

For example, where expected values of both input signal lines and an expected value of an output signal line of a 2-input NAND gate are [1] and [0], respectively, a failure propagation path estimated by the estimate process and passing this gate is considered. In other words, either one of the input signal lines is estimated to be [0] while the output signal line is estimated to be [1]. Through measurement by the analyzer, [0] was obtained as the actual measurement value of the output signal line of the NAND gate, which is identical to the expected value. At this point, the input signal line of the NAND which contradicts with the actual measurement value of the output signal of the NAND gate is the critical path and is changed to [1] that does not contradict with the actual measurement value. This process is repeated in the input direction to search for a critical path that contradicts with the measurement point and the logic value thereof is changed to a value that does not contradict with the actual measurement value.

The output-direction critical path searching unit 283, provided that the actual measurement value of the measurement point is an unexpected value that differs from the expected value, refers to the circuit configuration stored in the logic circuit configuration memory unit 41 and the failure propagation paths stored in the logic state memory unit 42 to trace the failure propagation paths in the output direction using the measurement point as the base point, and search for a critical path that propagates a failure state from the measurement point. The critical path is searched for by using the implication operation shown in FIG. 6 as the basic algorithm.

For example, where expected values of both input signal lines and an expected value of an output signal line of a 2-input NAND gate are [1] and [0], respectively, a failure propagation path estimated by the estimate process and passing this gate is considered. In other words, either one of the input signal lines is estimated to be [0] while the output signal line is estimated to be [1]. Through measurement by the analyzer, [0] was obtained as the actual measurement value of the input signal line of the NAND gate, which differs from the expected value. Since the actual measurement value of the input signal of the NAND gate is [0], the output signal of the NAND will inevitably be [1]. Accordingly, the output signal line of the NAND gate is a critical path. This process is repeated in the output direction to search for the critical path.

The contradicting path deleting unit 284 deletes the failure propagation path that contradicts with the logic value of the critical path searched by either the input-direction critical path searching unit 282 or the output-direction critical path searching unit 283, and changes the estimated value to a value that does not cause contradiction.

Returning to FIG. 1, description of the present embodiment will be continued.

The failure propagation path updating unit 29 stores the estimated values changed by the measurement point neighborhood implication operation unit 28 in the logic state memory unit 42.

In the data processor 2, blocks can readily be configured using logic circuits to obtain a one-chip configuration, which allows high-speed processing. In addition, the storage device 4 including memory units may be incorporated as a system LSI to allow faster processing.

Figure 3:
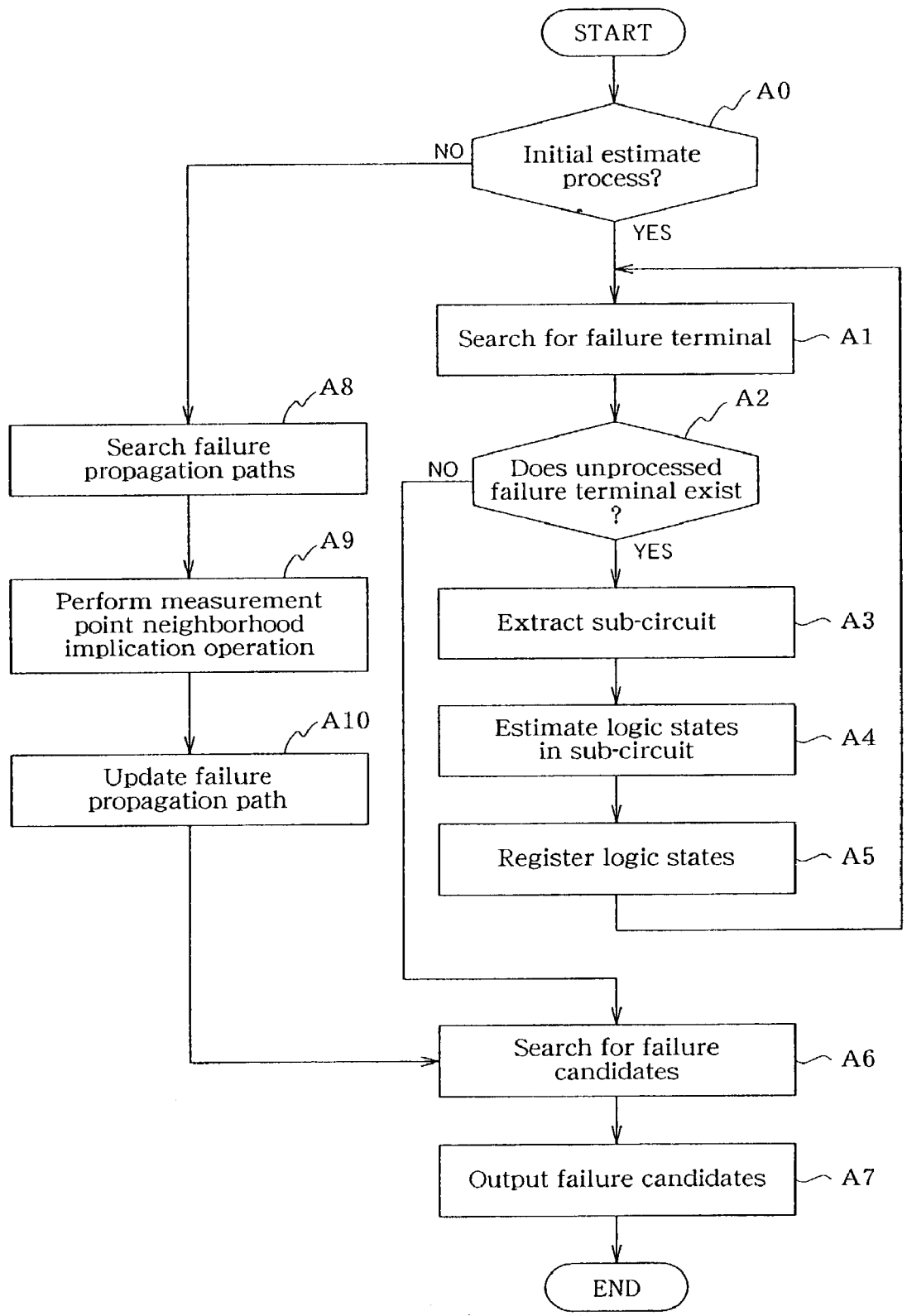
FIG. 3 is a flowchart showing an operation of the system shown in FIG. 1.

FIG. 3 is a flowchart showing the operation of the system shown in FIG. 1.

Hereinafter, the operation according to the present embodiment will be described with reference to FIGS. 1, 2, 3 and 6.

The logic states of the signal lines are expressed by four values, [0], [1], [U (Unknown)] and [X (Do not care)]. The present embodiment is also applicable to a case of logic states using difference expressions.

The logic state [U (Unknown)] expresses an unconfirmed state where the logic state of the signal line cannot be determined as [0] or [1] while the logic state [X (Don't care)] expresses a logic state where the logic state of the signal line does not contradict with the logic states in the whole circuit when it is either [0] or [1], and thus either [0] or [1] is allowable.

Based on the data input from the input device 1, the re-calculation judging unit 20 judges whether the present process is an initial process or re-calculation following measurement of actual measurement values. In the former case, the operation proceeds to Step A1, and in the latter case, the operation proceeds to Step A8 (Step A0).

The failure terminal searching unit 21 searches for a failure output terminal by referring to the circuit configuration stored in the logic circuit configuration memory unit 41 and the logic states stored in the logic state memory unit 42 (Step A1).

When a search target, i.e., a failure output terminal, is detected, the operation proceeds to Step A3. When no search target is found, the operation proceeds to Step A6 (Step A2).

Then, the sub-circuit extracting unit 22 extracts a sub-circuit relating to the failure output terminal searched by the failure terminal searching unit 21 by referring to the circuit configuration stored in the logic circuit configuration memory unit 41 (Step A3).

Extraction of the sub-circuit may be carried out by tracing the circuit for a few times in input/output directions or by utilizing the hierarchical design of the circuit, as described in Japanese Laid-Open Patent Application No. 10-062494.

Next, the sub-circuit logic state estimating unit 23 estimates the failure propagation paths in the sub-circuit by referring to the circuit configuration stored in the logic circuit configuration memory unit 41 as well as the logic states of the boundary of the sub-circuit stored in the logic state memory unit 42 (Step A4).

Then, the logic state registering unit 24 registers the logic states of the sub-circuit estimated in Step A4 in the logic state memory unit 42 (Step A5).

The failure candidate searching unit 25 searches for, as failure candidates, all nodes (gates, signal lines) on the failure propagation paths which may propagate a failure state to the failure output, by referring to the failure propagation path in the sub-circuit estimated by the sub-circuit logic state estimating unit 23 (Step A6). Since the node on path p1 may propagate a failure state to F1, F2, F3 and F4, the node on path p1 is detected as a failure candidate.

Finally, in Step A7, the failure candidate outputting unit 26 outputs the failure candidates searched by the failure candidate searching unit 25 to the output device 5.

When the present process is judged to be a re-calculation process in Step A0, the operation proceeds to Step A8 (Step A0).

The failure propagation path searching unit 27 reproduces the logic states in the circuit by referring to the expected value of each node in the circuit and the estimated failure propagation paths stored in the logic state memory unit 42 (Step A8).

In Step A9, the measurement point neighborhood implication operation unit 28 refers to the logic value of the measurement point stored in the actual measurement value memory unit 43. If the measurement point is a normal value, failure propagation paths that are propagating the failure state to the measurement point are searched for in the input direction. If the measurement point is an unexpected value, the failure propagation path that is propagating the failure state from the measurement point is searched in the output direction. Then, any path that contradicts with these paths is deleted.

Figure 4:
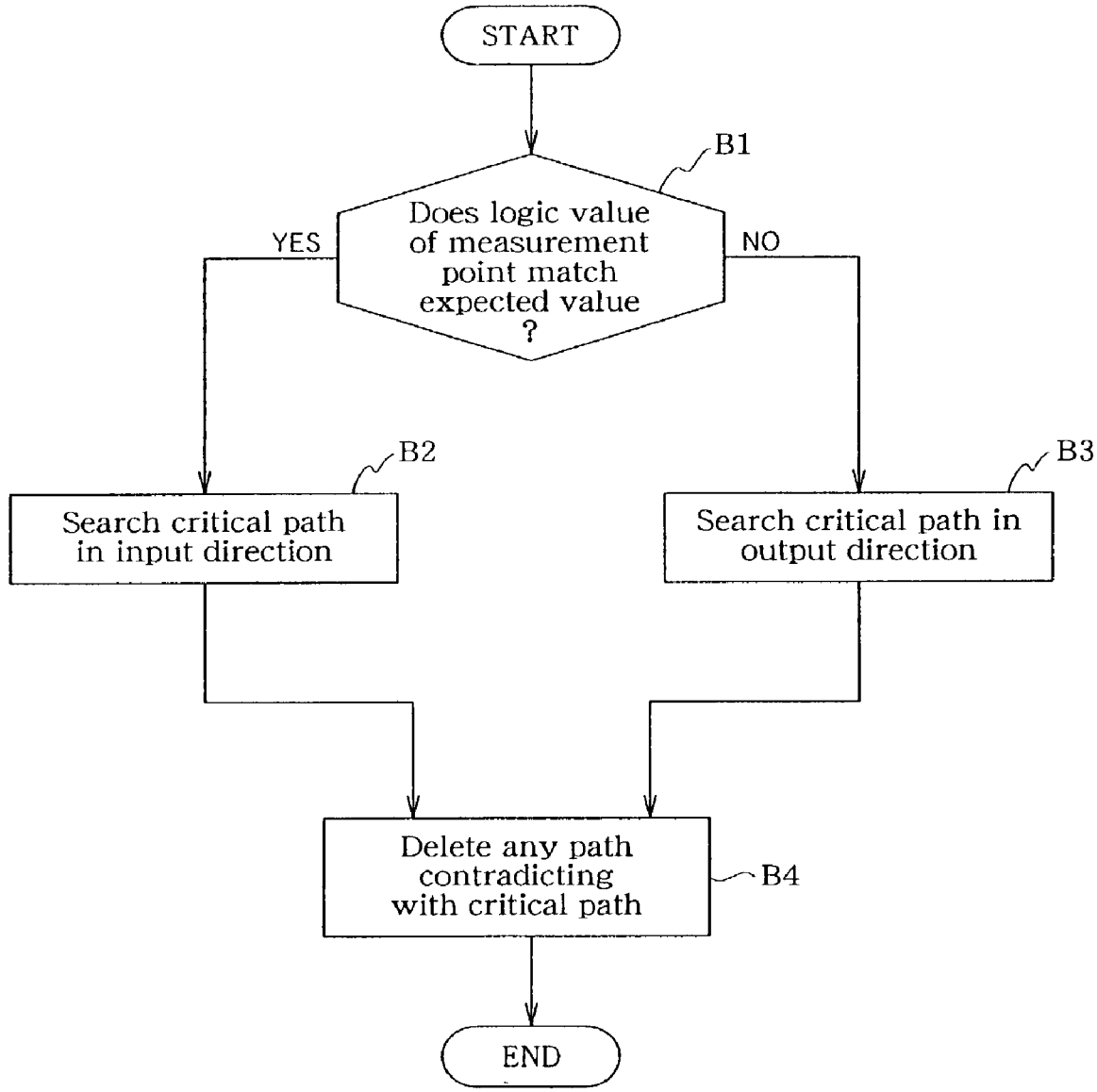
FIG. 4 is a flowchart showing an exemplary operation of Step A9 in FIG. 3.

FIG. 4 is a flowchart showing an exemplary operation of Step A9 in FIG. 3.

The measurement point neighborhood implication operation process in Step A9 will be described with reference to FIGS. 4 and 2.

The measurement point processing condition judging unit 281 refers to the expected value of the measurement point stored in the logic state memory unit 42 and the actual measurement value of the measurement point stored in the actual measurement value memory unit 43. If the logic value of the measurement point is a normal value identical to the expected value, the operation proceeds to Step B2. If the logic value of the measurement point is an unexpected value which differs from the expected value, the operation proceeds to Step B3 (Step B1).

The input-direction critical path searching unit 282, provided that the actual measurement value of the measurement point is a normal value, refers to the circuit configuration stored in the logic circuit configuration memory unit 41 as well as the failure propagation paths stored in the logic state memory unit 42 to trace the failure propagation paths in the input direction using the measurement point as the base point, and search for a critical path that propagates a failure state to the measurement point (Step B2). The critical path is searched for by using the implication operation shown in FIG. 6 as the basic algorithm.

For example, where expected values of both input signal lines and an expected value of an output signal line of a 2-input NAND gate are [1] and [0], respectively, a failure propagation path estimated by the estimate process and passing the gate is considered. In other words, either one of the input signal lines is estimated to be [0] while the output signal line is estimated to be [1].

Through measurement by the analyzer, [0] was obtained as the actual measurement value of the output signal line of the NAND gate, which is identical to the expected value. At this point, the input signal line of the NAND which contradicts with the actual measurement value of the output signal line of the NAND gate is the critical path and is changed to [1] that does not contradict with the actual measurement value. This process is repeated in the input direction to search for any critical path that contradicts with the measurement point and the logic value thereof is changed to a value that does not contradict with the actual measurement value.

The output-direction critical path searching unit 283, provided that the actual measurement value of the measurement point is an unexpected value that differs from the expected value, refers to the circuit configuration stored in the logic circuit configuration memory unit 41 and the failure propagation paths stored in the logic state memory unit 42 to trace the failure propagation paths in the output direction using the measurement point as the base point, and search for any critical path that propagates a failure state from the measurement point (Step B3). The critical path is searched for by using the implication operation shown in FIG. 6 as the basic algorithm.

For example, where expected values of both input signal lines and an expected value of an output signal line of a 2-input NAND gate are [1] and [0], respectively, a failure propagation path estimated by the estimate process and passing the gate is considered. In other words, either one of the input signal lines is estimated to be [0] while the output signal line is estimated to be [1]. Through measurement by the analyzer, [0] was obtained as the actual measurement value of the input signal line of the NAND gate, which differs from the expected value. At this point, since the actual measurement value of the input signal of the NAND gate is [0], the output signal of the NAND will inevitably be [1]. Accordingly, the output signal line of the NAND gate is a critical path. This process is repeated in the output direction to search for a critical path.

The contradicting path deleting unit 284 deletes the failure propagation path that contradicts with the logic value of the critical path searched in Step B2 or B3 (Step B4), and changes the estimated value to a value that does not cause contradiction. Thus, the measurement point neighborhood implication operation process in Step A9 is completed.

Returning to FIGS. 1 and 3, description of the present embodiment will be continued.

In Step A10, the failure propagation path updating unit 29 stores the estimated values changed by the measurement point neighborhood implication operation unit 28 in the logic state memory unit 42.

In Step A6, failure candidates are searched for by referring to the changed estimated values. Then, in Step A7, the failure candidates are output.

EXAMPLE

Hereinafter, an example of the present embodiment will be described in detail with reference to the drawings.

Figure 7:
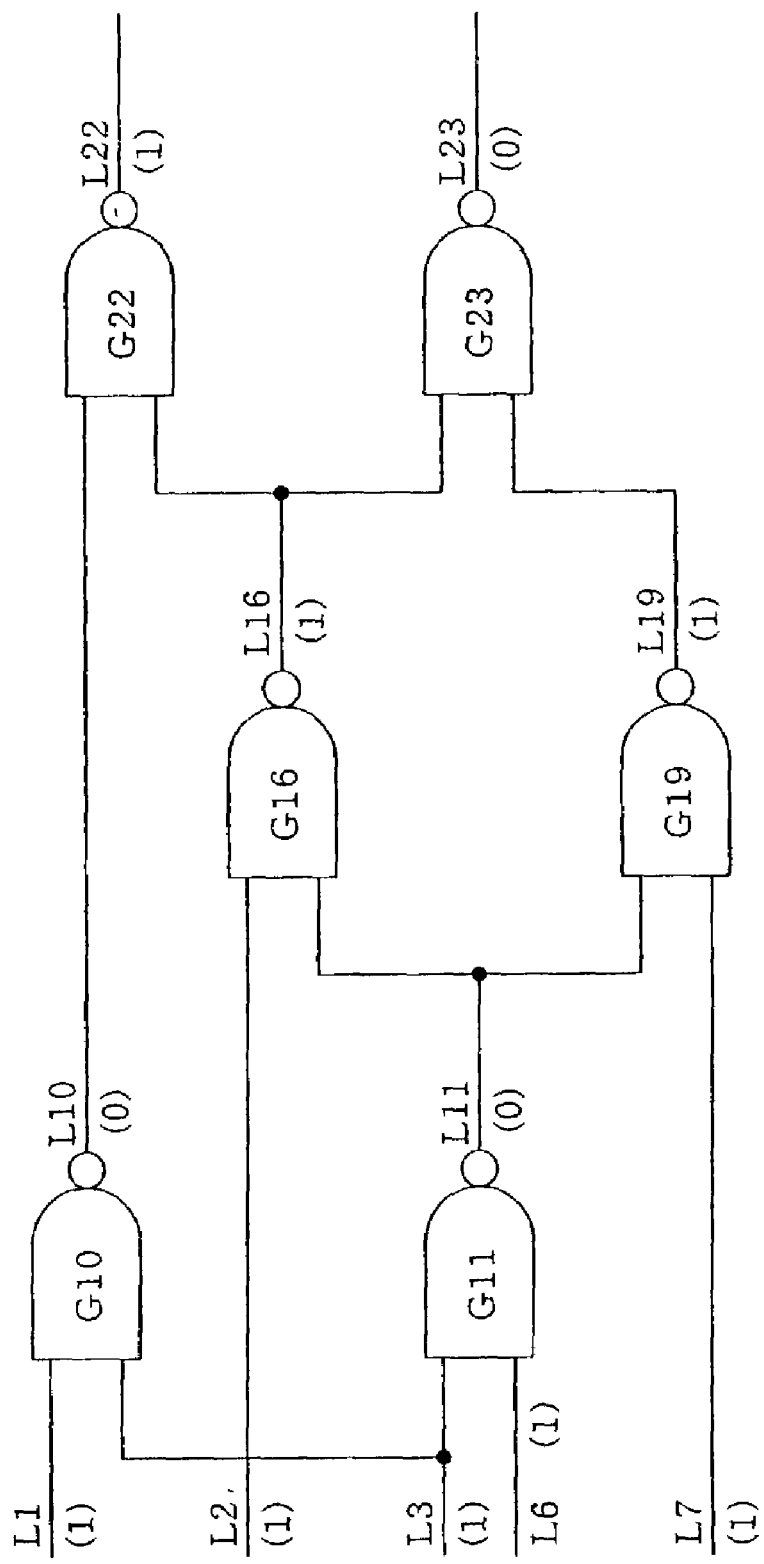
FIG. 7 is a diagram showing examples of expected values of the input/output terminals and logic values of the output signals.

The operation according to the present embodiment will be described with reference to FIG. 7. The principle of the failure location estimate process is the same as that of the conventional technique.

Assume that expected values of the input/output terminals and the nodes N1, N2, as well as logic values of the output signals (L22=1, L23=1) of target gates are given at an initial state. Accordingly, L23 is the failure output.

The initial state and the expected values of the input/output terminals and the signal lines are as follows: L1=X[1], L2=X[1], L3=X[1], L6=X[1], L7=X[1], L22 X[1] and L23=X[0](numbers in brackets represent the expected values).

Since this is the initial estimate process, the operation proceeds to Step A1 (Step A0).

In Step A1, the failure terminal searching unit 21 searches the logic circuit for a failure output terminal, whereby L23 is searched as the failure terminal.

Since an unprocessed failure terminal is detected, the operation proceeds to Step A3 (Step A2).

In Step A3, a sub-circuit relating to L23 is extracted by the sub-circuit extracting unit 22. Herein, the whole circuit is extracted.

Next, in Step A4, logic states in the sub-circuit are estimated by the sub-circuit logic state estimating unit 23.

Since there is no signal line state implicated by L22=1 and L23=1, signal lines whose logic values are to be assumed are searched. According to Japanese Laid-Open Patent Application No. 11-153646, logic values are assumed for input signal lines of gates which are connected to the failure signal line and whose states have not been confirmed (unconfirmed gate).

Figure 6:
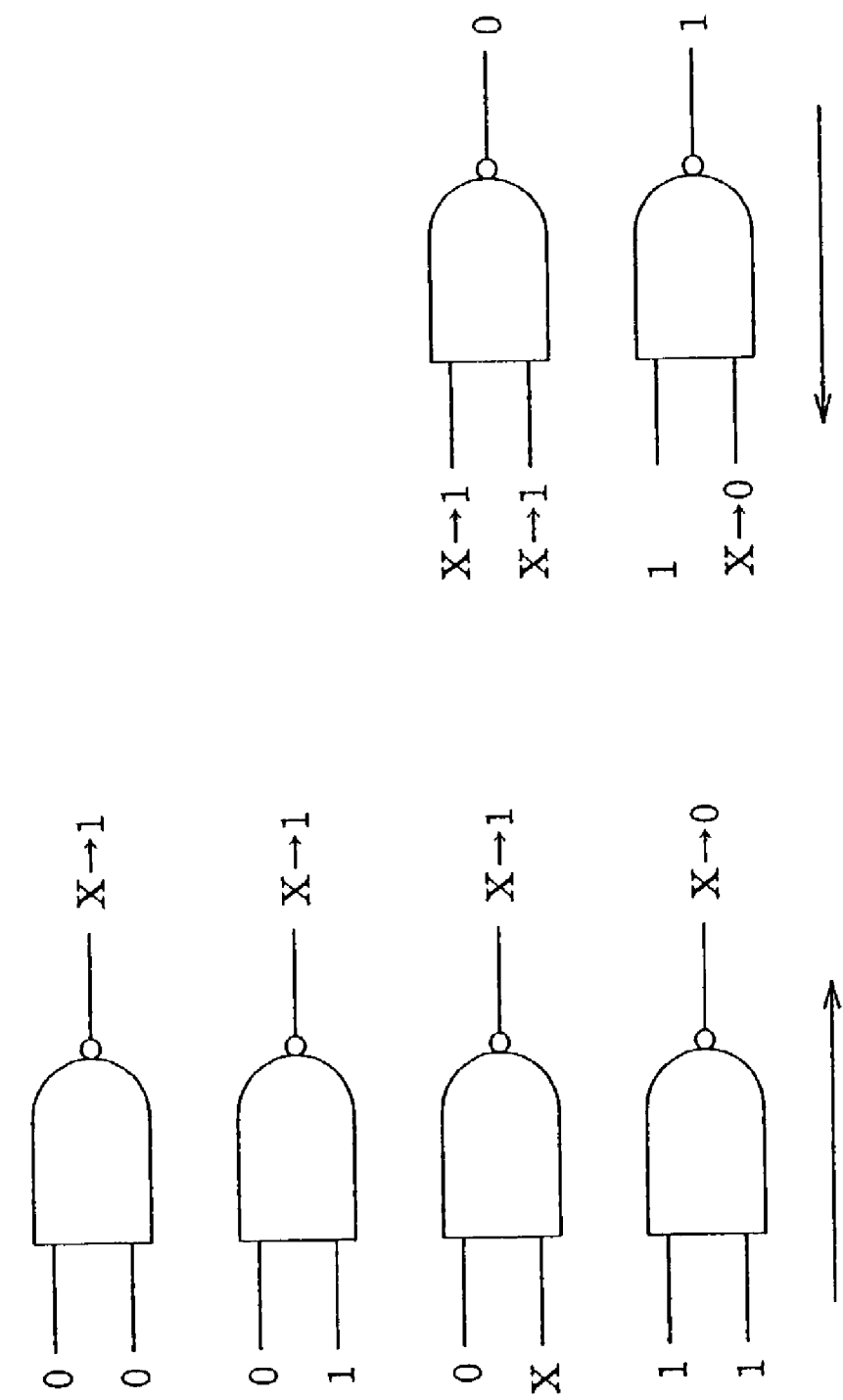
FIG. 6 is a diagram showing examples of implication operations for 2-input NAND gates in input/output directions.

Referring to FIG. 6 which shows implication operations for 2-input NAND gates in input/output directions, when the logic value of an output signal line is [1], either one of the logic values [X] of input signal lines should be [0]. When both of the logic values of the input signal lines are not yet confirmed, the gate is judged as an unconfirmed gate. Here, L16, one of the input signal lines of the gate G23 connected to the failure signal line L23 is assumed to have a logic value [0]. If L16=0, then L2=1 and L11=1 are implicated according to the implication operation for G16.

Figure 8:
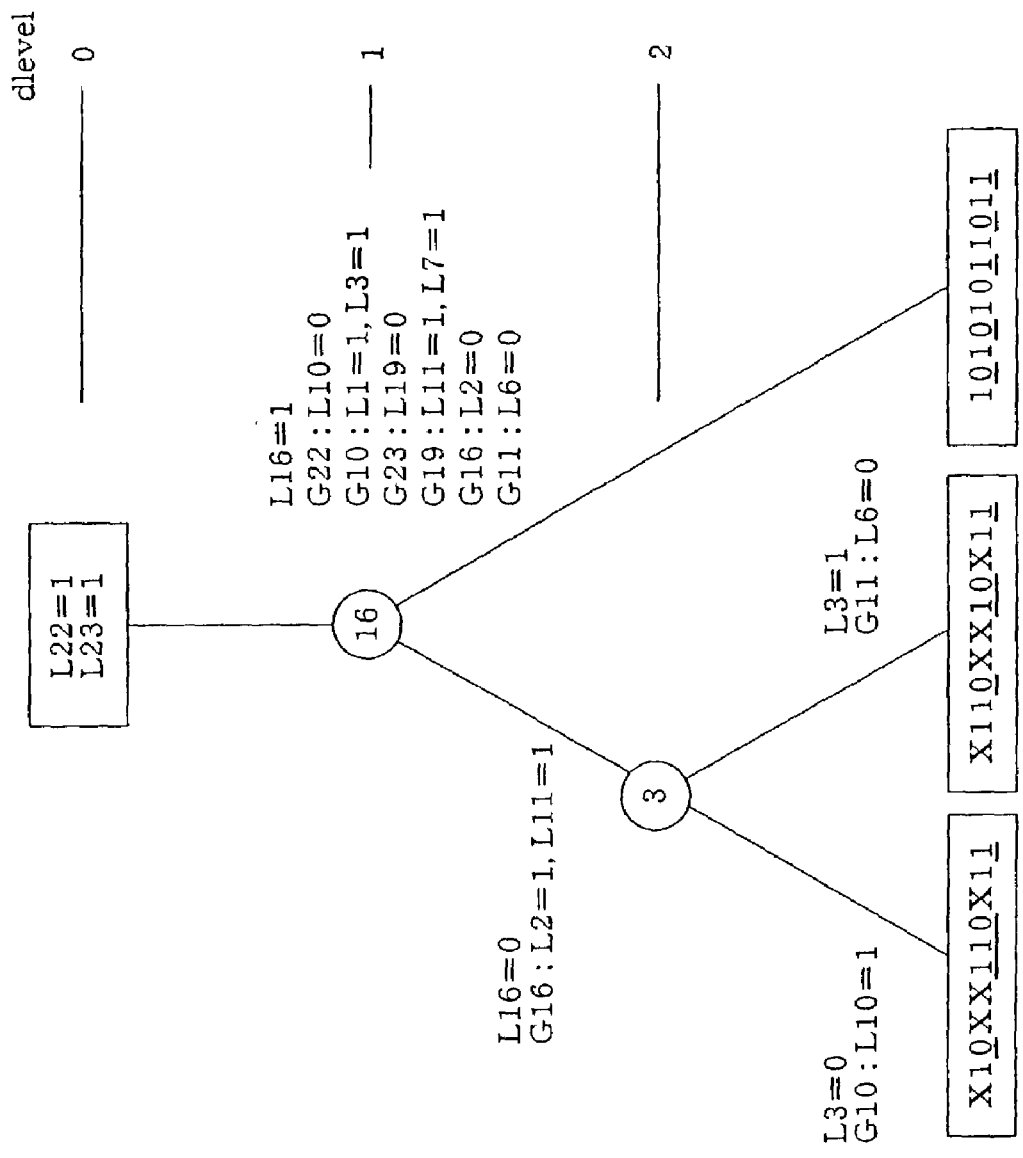
FIG. 8 is a diagram showing an exemplary decision tree for determining logic states.
Figure 9:
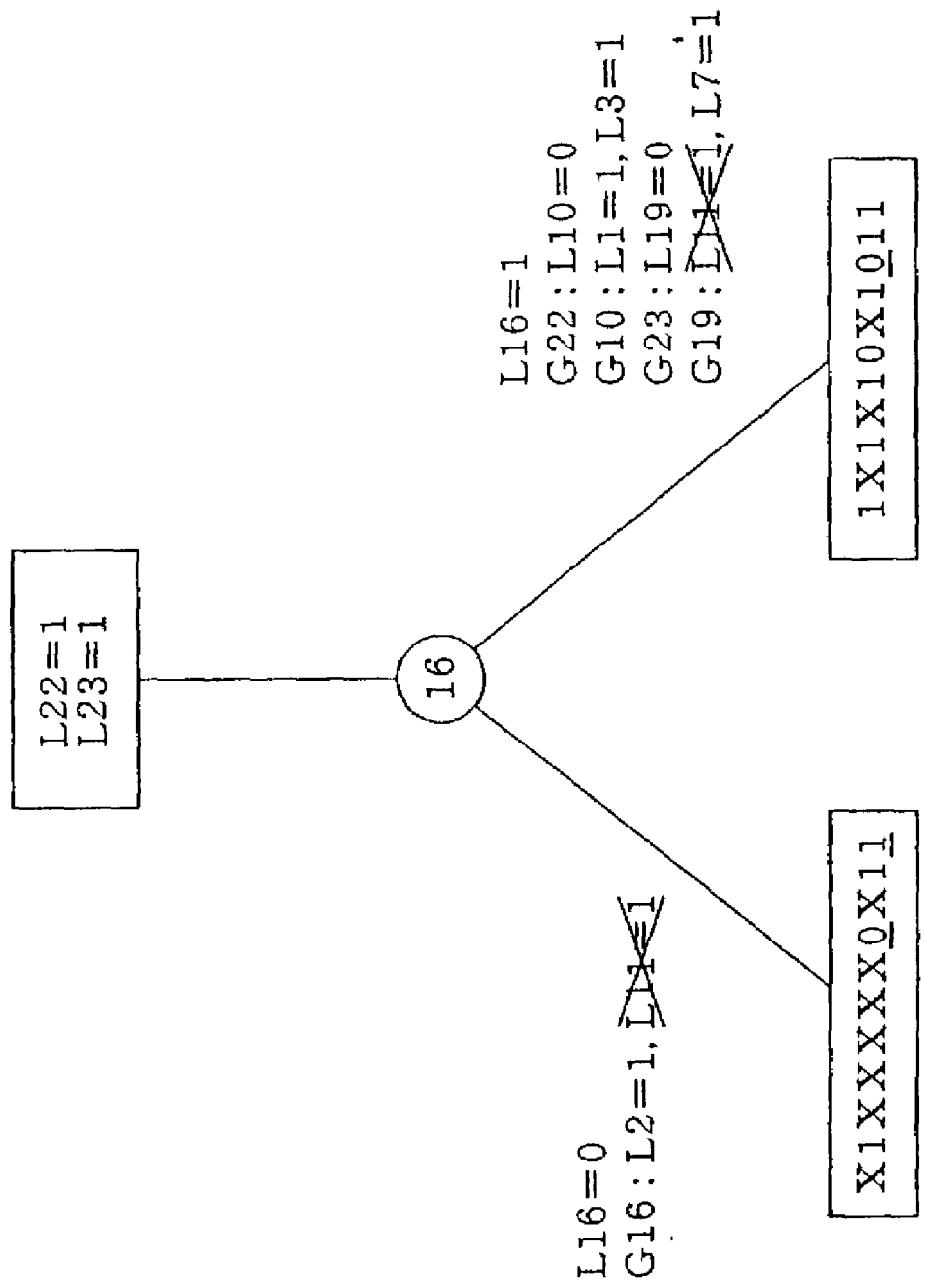
FIG. 9 is a diagram showing exemplary results of the decision tree.
Figure 10:
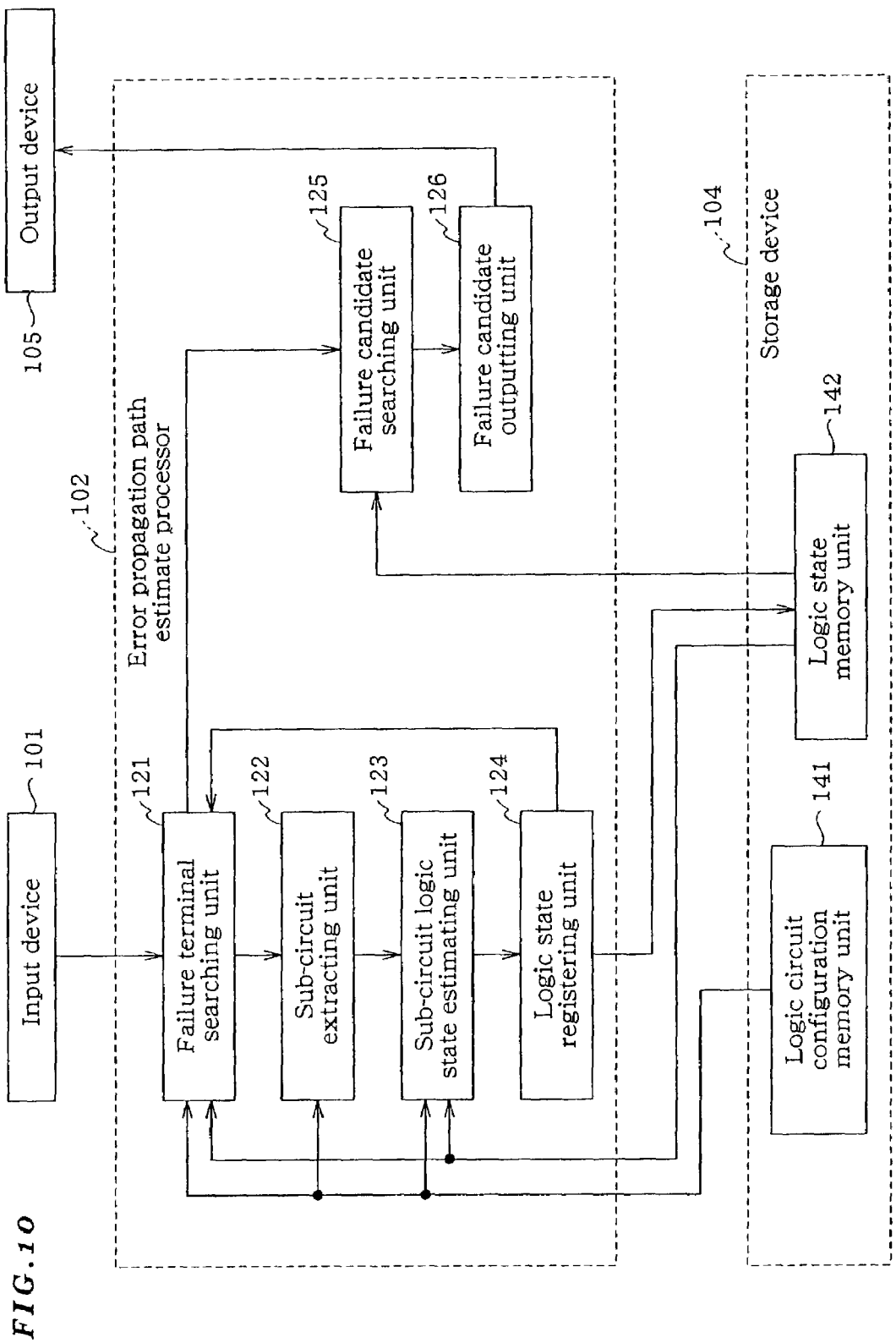
FIG. 10 is a block diagram showing an exemplary configuration of a failure propagation path estimate system according to a conventional technique.
Figure 11:
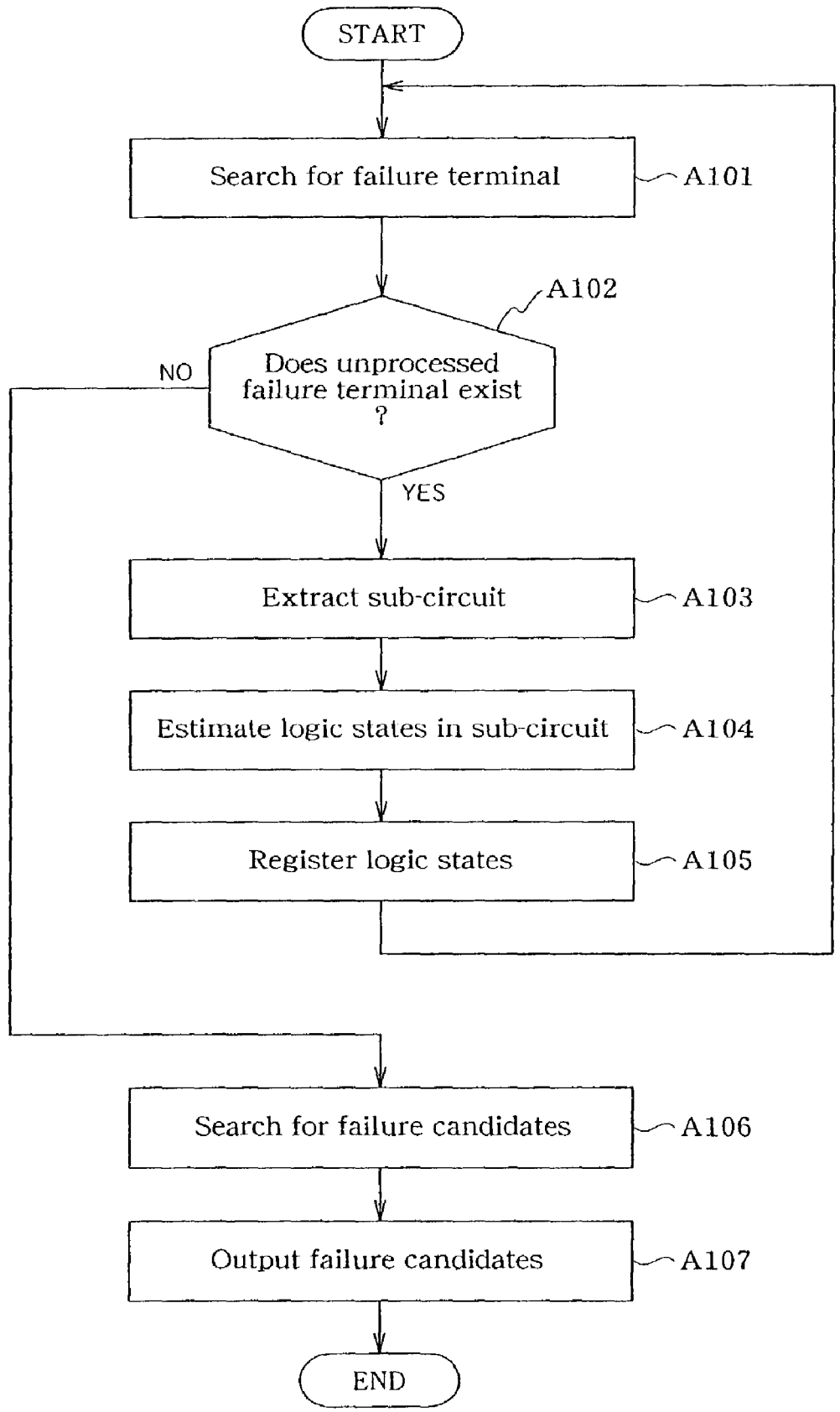
FIG. 11 is an exemplary flowchart of the operation of the system shown in FIG. 10.

Thereafter, the implication operation and logic assumption by assuming logic values for signal lines at two locations are repeated to determine three sets of logic states as represented by the decision tree shown in FIG. 8. The determined logic states in the circuit are represented by logic values of individual signal lines in the order of (L1, L2, L3, L6, L7, L10, L11, L16, L19, L22, L23) within the blocks in FIG. 8. The underlines represent failure propagation paths which differ from the expected values.

Then, in Step A5, the determined logic states in the logic circuit as well as the failure propagation paths are registered in the logic state memory unit 42.

Again, any failure terminal is searched for by the failure terminal searching unit 21 (Step A1). Since there is no unprocessed failure terminal, the operation proceeds to Step A6 (Step A2).

In Step A6, failure candidates on the failure propagation paths are searched for. At this point, three sets of logic states have been determined. As the failure candidates, {L3, L11, L16, L23} are determined from a set of states for case1=(X10XX110X11), {L6, L11, L16, L23} are determined from a set of states for case2=(X110XX10X11), and {L6, L11, L19, L23} are determined from a set of states for case3= (10101011011). Although L10 is estimated to differ from the expected value, it is neglected since a failure occurring at L10 would not affect L23. L2 in case3 is also neglected for not affecting L23.

These failure candidates are output in Step A7.

Hereinafter, a method for feeding back a measurement result to the estimate process will be described specifically, where the logic state of L11 determined by measurement with the analyzer is [0].

Since this is a process for feeding back the measurement point and not the first time to perform the estimate process, the operation proceeds to Step A8 (Step A0).

In Step A8, the logic states stored in the logic state memory unit 42 are searched to obtain three states, which are case1=(X10XX110X11), case2=(X110XX10X11) and case3 (10101011011).

In Step B1 shown in FIG. 4, L11=0 is judged to be identical to the expected value by the measurement point processing condition judging unit 281, and thus the operation proceeds to Step B2.

In Step B2, a path that propagates a failure state to the measurement point in the input direction is determined as a critical path and a logic value thereof is changed to a value that does not contradict with the measurement point.

Specifically, for case1, L3=0, L11=1, L16=0 and L23=1 are obtained as the failure propagation paths. Since L11=1 is estimated, L11 is determined as a critical path and the logic value thereof is changed to [0].

Any path that contradicts with L11=0 is traced in the input direction by which L6 is determined as a critical path and the logic value thereof is changed to [1]that does not contradict with the measurement result.

For case2, L6=0, L11=1, L16=0 and L23=1 are obtained as failure propagation paths. Since L11=1 is estimated, L11 is determined as a critical path and the logic value thereof is changed to [0].

Any path that contradicts with L11=0 is traced in the input direction, by which L6 is determined as a critical path and the logic value thereof is changed to [1] that does not contradict with the measurement result.

For case3, L6=0, L11=1, L19=0 and L23=1 are obtained as failure propagation paths. Since L11=1 is estimated, L11 is determined as a critical path and the logic value thereof is changed to [0].

Any path that contradicts with L11=0 is traced in the input direction, by which L6 is determined as a critical path and the logic value thereof is changed to [1] that does not contradict with the measurement result.

In Step B4, the failure propagation paths with updated logic states are case1={L16=0, L23=1}, case2={L16=0, L23=1} and case3={L19=0, L23=1}. Deletion of any path that contradicts with the measurement point and deletion of overlapping information will leave failure candidates, L16=0, L19=0 and L23=1.

Hereinafter, a method for feeding back a measurement result to the estimate process will be described specifically, where the logic state of L11 determined by measurement with the analyzer is [1].

Since this is a process for feeding back the measurement point and not the first time to perform the estimate process, the operation proceeds to Step A8 (Step A0).

In Step A8, the logic states stored in the logic state memory unit 42 are searched to obtain three states, which are case1=(X10XX110X11), case2=(X110XX10X11) and case3 (10101011011).

In Step B1 shown in FIG. 4, L11=1 is judged to be a logic that differs from the expected value by the measurement point processing condition judging unit 281, and thus the operation proceeds to Step B3.

In Step B3, a path that propagates a failure state to the measurement point in the output direction is determined as a critical path.

Specifically, for case1, L3=0, L11=1, L16=0 and L23=1 are obtained as failure propagation paths. Since L11=1 is estimated, L11 is determined as a critical path.

Any path that contradicts with L11=1 is traced in the output direction. Since L2=1 and L16=0 are the critical paths for G16. Further tracing will give L22=1 and L23=1 as critical paths.

For case2, L6=0, L11=1, L16=0 and L23=1 are obtained as failure propagation paths. Since L11=1 is estimated, L11 is determined as a critical path.

Since L2=1 and L16=0 are the critical paths for G16. Further tracing will give L22=1 and L23=1 as critical paths.

For case3, L6=0, L11=1, L19=0 and L23=1 are obtained as failure propagation paths. Since L11=1 is estimated, L11 is determined as a critical path.

Since L7=1 and L19=0 are the critical paths for G19. Further tracing will give L23=1 as a critical path.

In Step B4, the failure propagation paths with updated logic states are the same as the originally-obtained paths.

Although case1, case2 and case3 are processed individually herein, the failure propagation paths may be overlapped to be processed together.

Specifically, assume that where {L3, L11, L16, L23} are obtained from the set of states for case1=(X10XX110X11), {L6, L11, L16, L23} are obtained from the set of states for case2=(X110XX10X11), and {L6, L11, L19, L23} are obtained from the set of states for case3=(10101011011) as the failure propagation paths. Then, L3, L6, L11, L16, L19 and L23 are the paths.

When L11=0 is obtained as the measurement point, which is identical to the expected value, the path is traced in the input direction. Deletion of the paths of L3 and L6 which propagate the failure state to L11 will leave L16, L19 and L23 as the failure candidates.

When L11=1 is obtained as the measurement point, which differs from the expected value, the path is traced in the output direction to search for any contradicting path. Since there is no contradicting path in this case, no change is made to the failure candidates.

According to the conventional technique, in order to feed back the information of the measurement point to the results from the failure consulting process, the consulting process has to be performed from the beginning. On the other hand, according to the first embodiment of the invention, only failure propagation paths that affect the measurement point or affected by the measurement point are considered as targets of the process. As a result, for a large-scale circuit in which a measurement point may be distant from the failure output terminal and deep inside the circuit, a high speed estimate process can be achieved as compared to the conventional technique.

Figure 5:
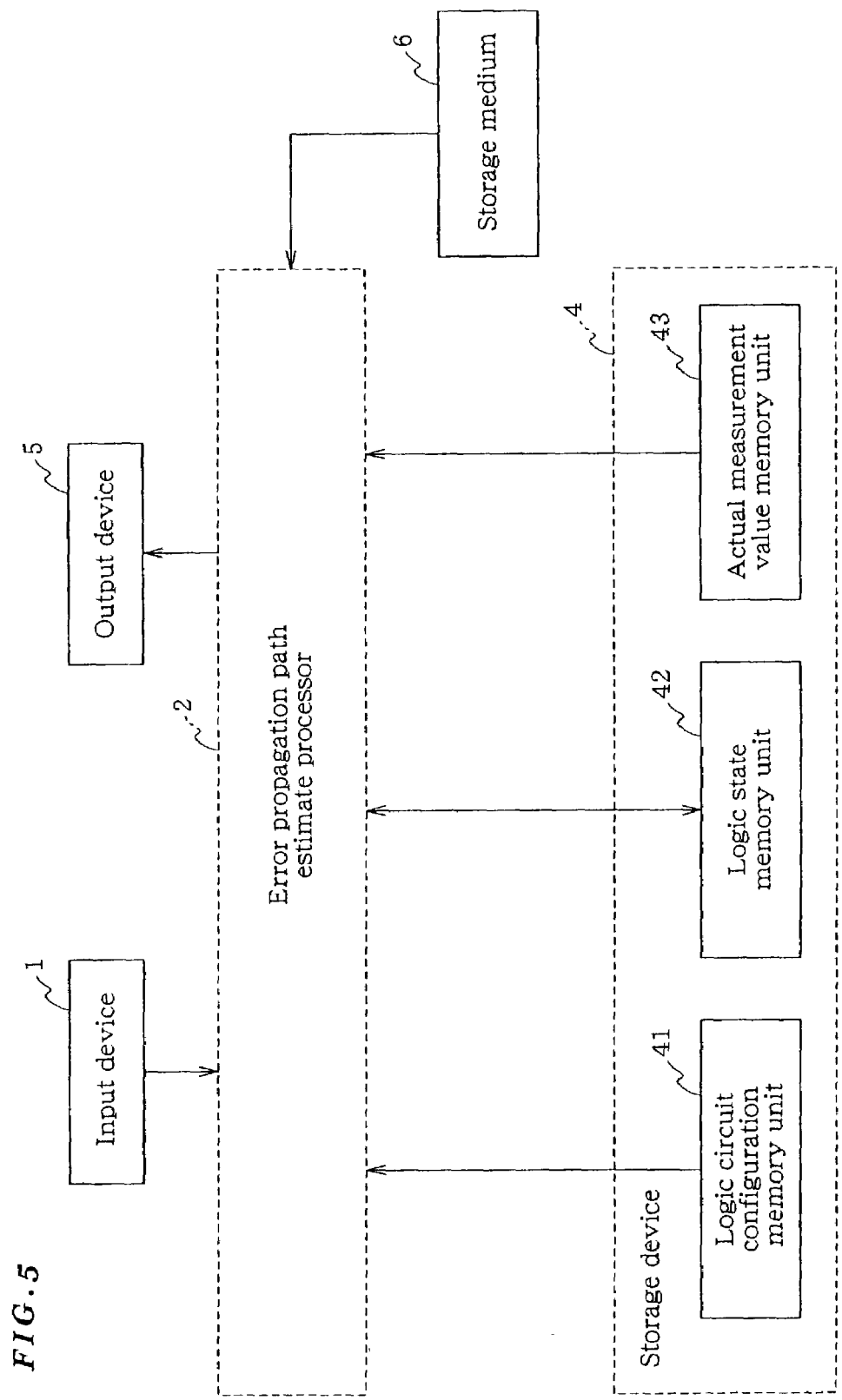
FIG. 5 is a block diagram showing another exemplary configuration of a failure propagation path estimate system according to an embodiment of the invention.

FIG. 5 is a block diagram showing another, exemplary configuration of a failure propagation path estimate system according to a second embodiment of the invention.

Hereinafter, an exemplary application of the failure propagation path estimate system according to the present embodiment will be described with reference to FIG. 5.

This system is provided with a storage medium 6 for storing a failure propagation path estimate computer program product. This storage medium 6 may be a magnetic disk, a semiconductor memory unit or other storage medium. Other than the storage medium 6, this system has the same configuration as that shown in FIG. 1.

The failure propagation path estimate program is read out from the storage medium 6 to a data processor 2 to control the operation thereof. The data processor 2, under the control of the failure propagation path estimate program, executes the subsequent process which is the same process performed by the data processor 2 according to the first embodiment.

When logic states of input/output terminals are provided by an input device 1, a re-calculation judging unit 20 judges whether the present process is an initial process or an estimate process following a measurement.

In the case of an initial estimate process, a failure terminal searching unit 21 searches for a failure output terminal, a sub-circuit extracting unit 22 extracts a sub-circuit relating to the failure output terminal, and a sub-circuit logic state estimating unit 23 estimates the logic states and the failure propagation paths in the sub-circuit.

A logic state registering unit 24 registers the estimated logic states and the failure propagation paths in a logic state memory unit 42.

Based on the obtained results, a failure candidate searching unit 25 searches for failure candidates, and a failure candidate outputting unit 26 outputs the failure candidates to an output device 5.

Once a measurement result is obtained with the analyzer, failure propagation paths estimated by a failure propagation path searching unit 27 are searched to verify the validity of the failure propagation paths relating to the measurement point with a measurement point neighborhood implication operation unit 28. Based on the obtained results, a failure propagation path updating unit 29 updates the failure propagation path information in the logic state memory unit 42.

Based on the results, the failure candidate searching unit 25 searches failure candidates, which are output by the failure candidate outputting unit 26 to the output device 5.

Thus, the failure location estimate system according to the present embodiment, separates the process while recognizing whether or not a present process is re-calculation. The previously processed failure location estimate results, i.e., the logic states of the circuit, are searched to verify the failure propagation paths in the neighborhood of the measurement point. Based on the results, the failure propagation paths are updated to produce new failure candidates. Specifically, the failure propagation path estimate processor is provided with a re-calculation judging unit for judging whether or not the present process is re-calculation, a failure propagation path searching unit for searching the previously-processed failure location estimate results, a measurement point neighborhood implication operation unit for verifying the failure propagation paths relating to the measurement point, and a failure propagation path updating unit for updating the failure propagation paths. Furthermore, the measurement point neighborhood implication operation unit is provided with a measurement point processing condition judging unit for judging whether or not the measurement result of the measurement point is identical to the expected value, an input-direction critical path searching unit for searching for paths propagating the failure state to the measurement point in the input direction, an output-direction critical path searching unit for searching for paths propagating the failure state to the measurement point in the output direction, and a contradicting path deleting unit for deleting any path that contradicts with the critical path.

The failure propagation path estimate system according to the present embodiment with the above-described configuration is associated with the following advantages.

The re-calculation judging unit judges whether the present process is an initial process or re-calculation following measurement of an actual measurement value. If the process is an initial process, a general estimate process takes place. If the process is re-calculation, the operation proceeds to a separated process to verify/update the failure propagation paths in the vicinity of the measurement point. The failure propagation paths previously estimated by the failure propagation path searching unit are searched to reproduce the logic states inside the circuit. The measurement point neighborhood implication operation unit verifies the presence of logics that contradict with the actual measurement value by referring to the actual measurement value and the expected value of the measurement point as well as the failure propagation paths of the circuit. Any contradicting path is deleted. A measurement point processing condition judging unit compares the expected value and the actual measurement value of the measurement point, and separates the process depending on whether the actual measurement value is a normal value identical to the expected value or an unexpected value which differs from the expected value. An input-direction critical path searching unit, provided that the actual measurement value of the measurement point is a normal value, refers to the circuit configuration as well as the failure propagation paths to trace the failure propagation paths in the input direction using the measurement point as the base point, to search for a critical path that propagates a failure state to the measurement point, and change the logic value thereof to a value that does not contradict with the actual measurement value. Thus, the failure propagation paths, where the value of the measurement point is normal, can be verified.

The output-direction critical path searching unit, provided that the actual measurement value of the measurement point is an unexpected value that differs from the expected value, refers to the circuit configuration stored in the logic circuit configuration memory unit and the failure propagation paths stored in the logic state memory unit to trace the failure propagation paths in the output direction using the measurement point as the base point, to search for a critical path that propagates a failure state from the measurement point. Thus, failure propagation paths, where the value of the measurement point is an unexpected value, can be verified.

The process is separated depending on whether the process is an initial process or re-calculation, the previously-estimated failure propagation paths are verified upon re-calculation, and any path contradicting with the measurement point is deleted. Therefore, an estimate process can be performed by adding the measurement result to the failure location estimate results estimated prior to the measurement. Furthermore, since not the whole circuit but only a part of the circuit relating to the measurement point is subjected to re-calculation and verification of the failure propagation paths, re-calculation of the failure propagation paths can be performed at high speed with reference to the measurement result.

According to the present embodiment of the invention, the present invention is not limited to the above-described configuration, and can be applied to any failure propagation path estimate system suitable to the present invention.

The number, location, shape and the like of each member of the above-described configuration are not limited to those of the above-described embodiments, and may be altered to any number, location, shape and the like suitable to the present invention.

In the figures, the same components are denoted by the same reference numerals.

The present invention having the above-described structure has the following advantages.

First advantage is that an estimate process can be performed by adding a result from a measurement to a result from a failure location estimate performed prior to the measurement. This can be realized since the process is separated depending on whether the process is an initial process or re-calculation. In the case of re-calculation, the previously-estimated failure propagation paths are verified so as to delete any path that contradicts with the measurement point.

Second advantage is that the re-calculation of the failure propagation paths referring to the measurement result allows high speed performance. This can be realized since not the whole circuit but only a part of the circuit relating to the measurement point is subjected to re-calculation and verification of the failure propagation paths.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and rage of equivalency of the claims are therefore intended to be embraced therein.

The entire disclosure of Japanese Patent Application No. 2001-212502 (Filed on Jul. 12, 2001) including specification, claims, drawings and summary are incorporated herein by reference in its entirety.

What is claimed is:

1. A processor-readable medium incorporating a program for instructions that configure a processor to function as a failure propagation path estimate system for estimating a logic state and a failure propagation path in a logic circuit by repeating an assumption and an implication operation of logic values based on a failure output terminal in the logic circuit, the system comprising:
   a re-calculation judging unit for judging whether a present process is an initial estimate process or a re-calculation following a measurement, such that the re-calculation is performed when an initial failure location estimate process has already taken place to reflect a measurement result of the measurement on the result obtained from the failure location estimate process;
   a failure propagation path searching unit for searching the failure propagation paths obtained from the previous estimate process;
   a measurement point neighborhood implication operation unit for verifying measured values of nodes in the logic circuit for each of the searched failure propagation paths, including a path whose logic state is implicated upon confirming the measured value of the nodes and a path causative of propagating a failure state to the measured value; and
   a failure propagation path updating unit for updating the failure propagation path according to the verified values,
   wherein the failure propagation path estimate is then continued based on the verified values.

2. The processor-readable medium according to claim 1, wherein the measurement point neighborhood implication operation unit verifies a plurality of failure propagation paths at once by overlapping the plurality of failure propagation paths, to verify measured values of nodes in the logic circuit, including a path whose logic state is implicated upon confirming the measured value of the nodes and a path causative of propagating a failure state to the measured value.

3. The processor-readable medium according to claim 1, wherein the measurement point neighborhood implication operation unit comprises:
   an input-direction critical path searching unit which, when an actual measurement value of the measured value is a normal value identical to the expected value, traces the failure propagation paths in the input direction using the measured value as a basic point, and changes measured values of the nodes propagating the failure state to the measured value to values that does not contradict with the actual measurement value of the measured value; and
   a contradicting path deleting unit for deleting the failure propagation path information that contradicts with the actual measurement value of the measured value.

4. The processor-readable medium according to claim 1, wherein the measurement point neighborhood implication operation unit comprises an outputdirection critical path searching unit which, when an actual measurement value of the measured value is an unexpected value that differs from the expected value, traces the failure propagation paths in the output direction using the measured value as a basic point, and searches for any path which is implicated to have a failure state due to the measured value.

5. A failure propagation path estimate method for estimating a logic state and a failure propagation path in a logic circuit by repeating an assumption and an implication operation based on a failure output terminal in the logic circuit, the method comprising:
   a first step of judging whether a present process is an initial estimate process or re-calculation following a measurement, where the re-calculation is performed, when an initial failure location estimate process has already taken place, to reflect the measurement result on the result from the failure location estimate process;
   a second step of searching the failure propagation paths obtained from the previous estimate process;
   a third step of measuring values of nodes in the logic circuit;
   a fourth step of verifying the measured values of the nodes in the logic circuit for each of the searched failure propagation paths, including a path whose logic state is implicated upon confirming the measured value and a path causative of propagating a failure state to the measured value; and
   a fifth step of updating the failure propagation path according to the verified results obtained by the fourth step,
   wherein the failure propagation path estimate is then continued based on the verified values.

6. A failure propagation path estimate method according to claim 5, wherein the fourth step comprises a step of verifying a plurality of failure propagation paths at once by overlapping the plurality of failure propagation paths, to verify measured values of nodes in the logic circuit, including a path whose logic state is implicated upon confirming the measured values of the nodes in the logic circuit and a path causative of propagating of a failure state to the measured values.

7. A failure propagation path estimate method according to claim 5, wherein the fourth step, when an actual measurement value of the measured value is a normal value identical to the expected value, comprises steps of:
tracing the failure propagation paths in the input direction using the measured value as a basic point, and changing logic values of the paths propagating the failure state to the measured value to values that does not contradict with the actual measurement value of the measured value; and
deleting the failure propagation path information that contradicts with the actual measurement value of the measured value.

8. A failure propagation path estimate method according to claim 5, wherein the fourth step, when an actual measurement value of the measured value is an unexpected value that differs from the expected value, comprises the steps of:
tracing the failure propagation paths in the output direction using the measured value as a basic point; and
searching for any path which is implicated to have a failure state due to the measured value.

9. The processor-readable medium according to claim 1, wherein the nodes is nodes of combinational logic.

10. A storage medium for storing a computer program product to execute a failure propagation path estimate process for estimating a logic state and a failure propagation path in a logic circuit by repeating an assumption and an implication operation of logic values based on a failure output terminal in the logic circuit, the process comprising:
a re-calculation judging step for judging whether a present process is an initial estimate process or re-calculation following a measurement, where the re-calculation is performed, when an initial failure location estimate process has already taken place, to reflect the measurement result on the result obtained from the failure location estimate process;
a failure propagation path searching step for searching the failure propagation paths obtained from the previous estimate process;
a measurement point neighborhood implication operation step for verifying measured values of nodes in the logic circuit for each of the searched failure propagation paths, including a path whose logic state is implicated upon confirming the measured value of the nodes and a path causative of propagating a failure state to the measured value; and
a failure propagation path updating step for updating the failure propagation path according to the verified results,
wherein the failure propagation path estimate is then continued based on the verified values.

11. A storage medium for storing a computer program product to execute a failure propagation path estimate process for estimating a logic state and a failure propagation path in a logic circuit by repeating an assumption and an implication operation of logic values based on a failure output terminal in the logic circuit, where re-calculation is performed, when an initial failure location estimate process has already taken place, to reflect the measurement result on the result obtained from the failure location estimate process, wherein the process comprises:
a measurement point neighborhood implication operation step for verifying a plurality of failure propagation paths at once by overlapping the plurality of failure propagation paths, to verify measured values of nodes in the logic circuit, including a path whose logic state is implicated upon confirming the measured value of the nodes and a path causative of propagating a failure state to the measured value,
wherein the failure propagation path estimate is then continued based on the verified values.

12. A storage medium for storing a computer program product to execute a failure propagation path estimate process for estimating a logic state and a failure propagation path in a logic circuit by repeating an assumption and an implication operation of logic values based on a failure output terminal in the logic circuit, where re-calculation is performed, when an initial failure location estimate process has already taken place, to reflect the measurement result on the result obtained from the failure location estimate process, wherein, when an actual measurement value of a measured value of a node in the logic circuit is a normal value identical to the expected value, the failure propagation path estimate process further comprises:
an input-direction critical path searching step in which the failure propagation paths are traced in the input direction using the measured value as a basic point, and measured values of the node propagating the failure state to the measured value are changed to values that does not contradict with the actual measurement value of the measured value; and
a contradicting path deleting step for deleting the failure propagation path information that contradicts, with the actual measurement value of the measured value,
wherein the failure propagation path estimate is then continued based on the measured values.

13. A storage medium for storing a computer program product to execute a failure propagation path estimate process for estimating a logic state and a failure propagation path in a logic circuit by repeating an assumption and an implication operation of logic values based on a failure output terminal in the logic circuit, where re-calculation is performed, when an initial failure location estimate process has already taken place, to reflect the measurement result on the result obtained from the failure location estimate process, wherein, when an actual measurement value of a measured value of a node in the logic circuit is an unexpected value that differs from the expected value, the failure propagation path estimate process further comprises:
an output-direction critical path searching step in which the failure propagation paths are traced in the output direction using the measured value as a basic point, and any path which is implicated to have a failure state due to the measured value is searched,
wherein the failure propagation path estimate is then continued based on the verified values.

14. A storage medium for storing a computer program product capable of executing a failure propagation path estimate method, the method comprising:
a first step of judging whether a present process is an initial estimate process or re-calculation following a measurement, where the re-calculation is performed, when an initial failure location estimate process has already taken place, to reflect the measurement result on the result from the failure location estimate process;

a second step of searching failure propagation paths obtained from the previous estimate process;

a third step of measuring values of nodes in a logic circuit;

a fourth step of verifying measured values of the nodes for each of the searched failure propagation paths, including a path whose logic state is implicated upon confirming the measured value and a path causative of propagating a failure state to the measured value; and a fifth step of updating the failure propagation path according to the verified results obtained by the fourth step, wherein the failure propagation path estimate is then continued based on the verified values.

* * * * *